United States Patent
Chou (10) Patent No.: US 6,839,225 B2
(45) Date of Patent: Jan. 4, 2005

(54) EXTERNAL KEYBOARD STRUCTURE

(76) Inventor: Chun-Chien Chou, 8F, No. 69, Jianguo 1st Rd., Shinjuang City, Taipei (TW)

( * ) Notice: Subject to any disclaimer, the term of this patent is extended or adjusted under 35 U.S.C. 154(b) by 0 days.

(21) Appl. No.: 10/348,170

(22) Filed: Jan. 22, 2003

(65) Prior Publication Data

US 2004/0141283 A1 Jul. 22, 2004

(51) Int. Cl.$^7$ ................................................. G06F 1/26
(52) U.S. Cl. ........................ 361/680; 345/905; 400/88; 200/512
(58) Field of Search ................................. 361/679–687, 361/724–727; 341/22; 400/489, 682, 691–693, 82, 88; 345/168–169, 905; 200/5 A, 512, 517, 344–345

(56) References Cited

U.S. PATENT DOCUMENTS

| | | | | |
|---|---|---|---|---|
| 6,257,782 B1 | * | 7/2001 | Maruyama et al. | 400/495.1 |
| 6,501,038 B2 | * | 12/2002 | Hayashi et al. | 200/344 |
| 6,529,370 B1 | * | 3/2003 | Kamishima | 361/680 |

* cited by examiner

*Primary Examiner*—Hung Van Duong
(74) *Attorney, Agent, or Firm*—Birch, Stewart, Kolasch & Birch, LLP (57) ABSTRACT

An external keyboard structure for connecting a keyboard or various handheld devices by a wireless signal or a connector, and then used as a keyboard structure for storing or driving the whole keyboard; such a structure comprises a folding base; an adjusting device disposed on the folding base and corresponsive to the keyboard; and an accommodating area disposed between the folding base and a keyboard.

18 Claims, 6 Drawing Sheets

EXTERNAL KEYBOARD STRUCTURE

FIELD OF INVENTION

The present invention relates to an external keyboard structure, more particularly to a keyboard or various handheld devices connected by a wireless signal or a connector and used as a keyboard structure for storing or driving the whole keyboard.

BACKGROUND OF THE INVENTION

In general, a prior-art personal digital assistant (PDA) usually inputs data by a touch-screen pen, and also inputs messages by a multiple of keys the same way as a mobile phone does. However, the external keyboard becomes a very important accessory for inputting data for long time. Therefore, the way of integrating the aforementioned products and the keyboard to maximize the utility of the keyboard and minimize its size to facility the carrying when the keyboard is not in use is definitely an important subject for the research and development of the present high-tech external keyboard structure.

Furthermore, to provide a sufficient number and appropriate size of the keys, the structure of an ordinary external keyboard must be large enough and sometimes is even larger than a handheld device, such as the personal digital assistant itself, making the carrying very inconvenient. Moreover, considering the overall layout and minimization of size, many common keys are omitted or compound keys are used as substitutes, which makes the operation very inconvenient as well. Further, an ordinary external keyboard can be connected and fixed by a connector without additional support. If there is a slight vibration or shaking, it is common to see that the keyboard is detached or the signal is interrupted. Therefore, such kind of keyboard is limited for the use on a stable surface only, and cannot be used for a handheld operation, not mentioned the use in outdoors or even in a motor vehicle. It definitely affects the mobility of the handheld device.

SUMMARY OF THE INVENTION

The principal objective of the present invention is to overcome and avoid the above deficiencies by providing a keyboard or various handheld devices that is connected by a wireless signal or a connector and used as a keyboard structure for storing or driving the whole keyboard, then is becoming applied in a keyboard structure. After the external keyboard structure is opened, sufficient space is provided for placing the personal digital assistant or various handheld devices that can be used on a plane or directly operated in a handheld position to enhance the mobility.

To accomplish the above objective, the present invention is mainly used to connect a keyboard or various handheld devices with a wireless signal or a connector, and the structure of the present invention comprises a folding base; an adjusting device disposed on the folding base and corresponsive to the keyboard; and an accommodating area disposed between the folding base and a keyboard.

To provide a further understanding of the present invention, the following detailed description illustrates embodiments and examples of the invention, this detailed description being provided only for illustration of the invention.

DETAILED DESCRIPTION OF THE PREFERRED EMBODIMENTS

Figure 1:
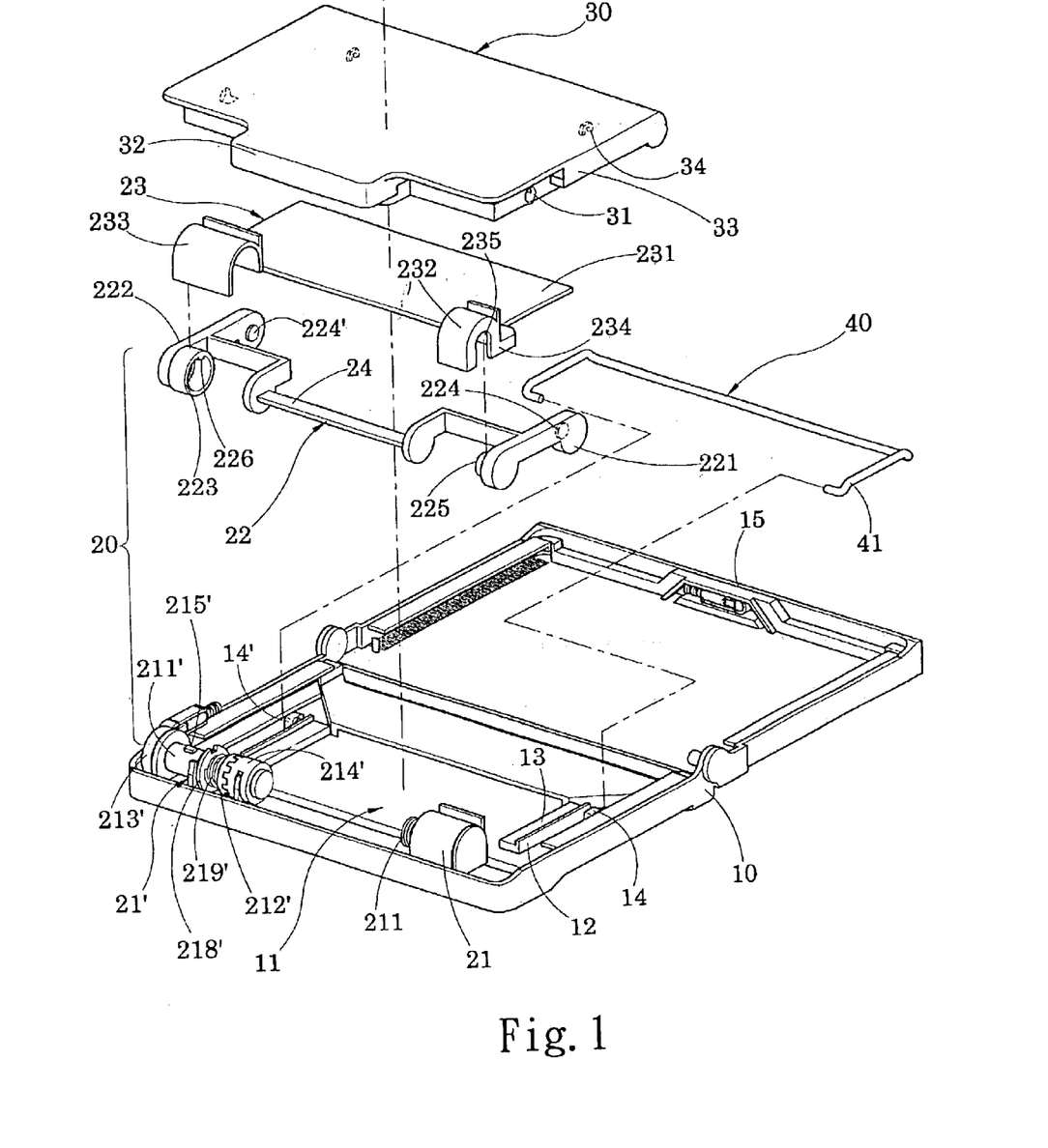
FIG. 1 is an illustrative diagram of the disassembled parts of the structure of the present invention.
Figure 2A:
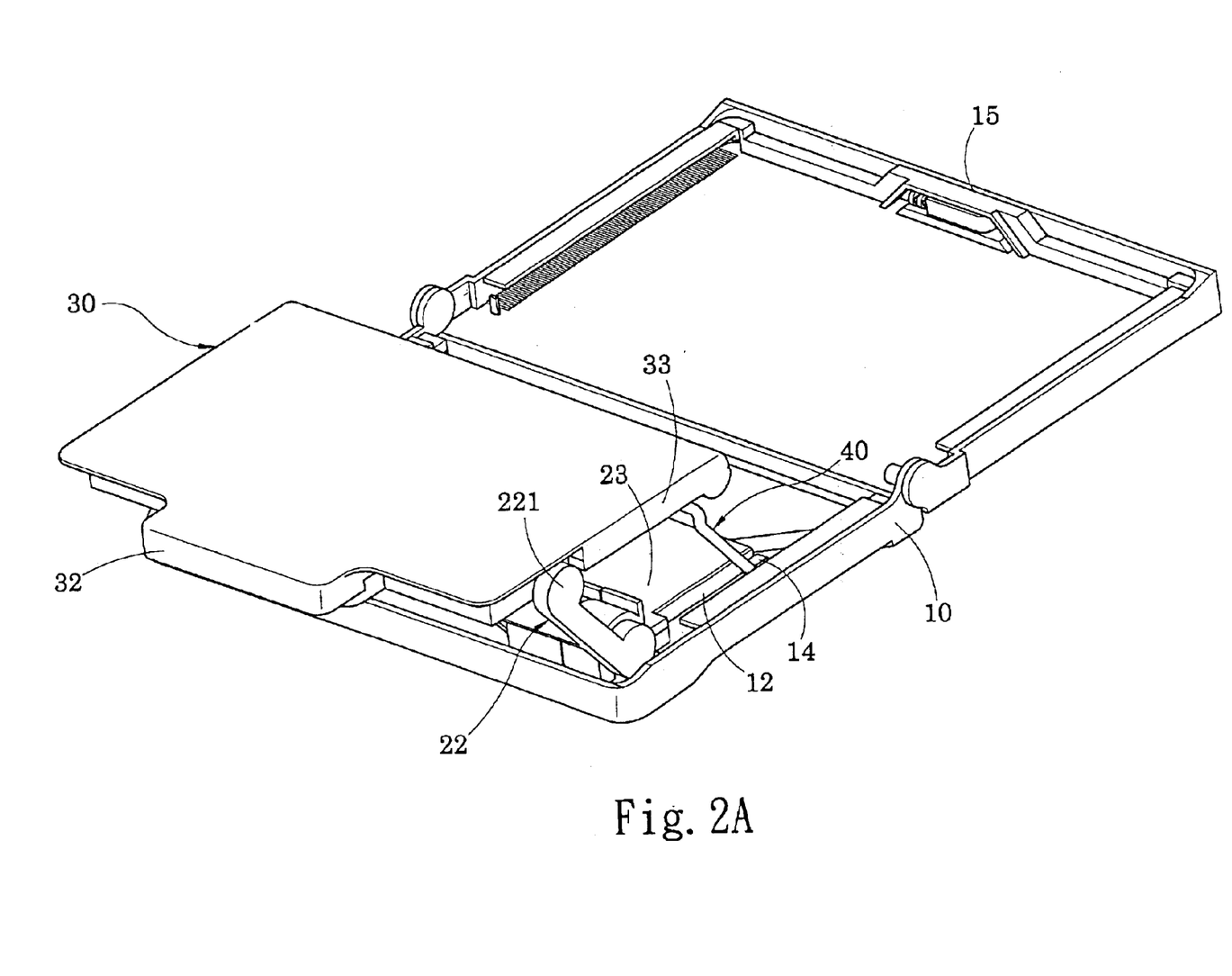
FIGS. 2A and 2B are illustrative diagrams showing the motions of making adjustments to the overall assembled structure of the present invention.
Figure 2B:
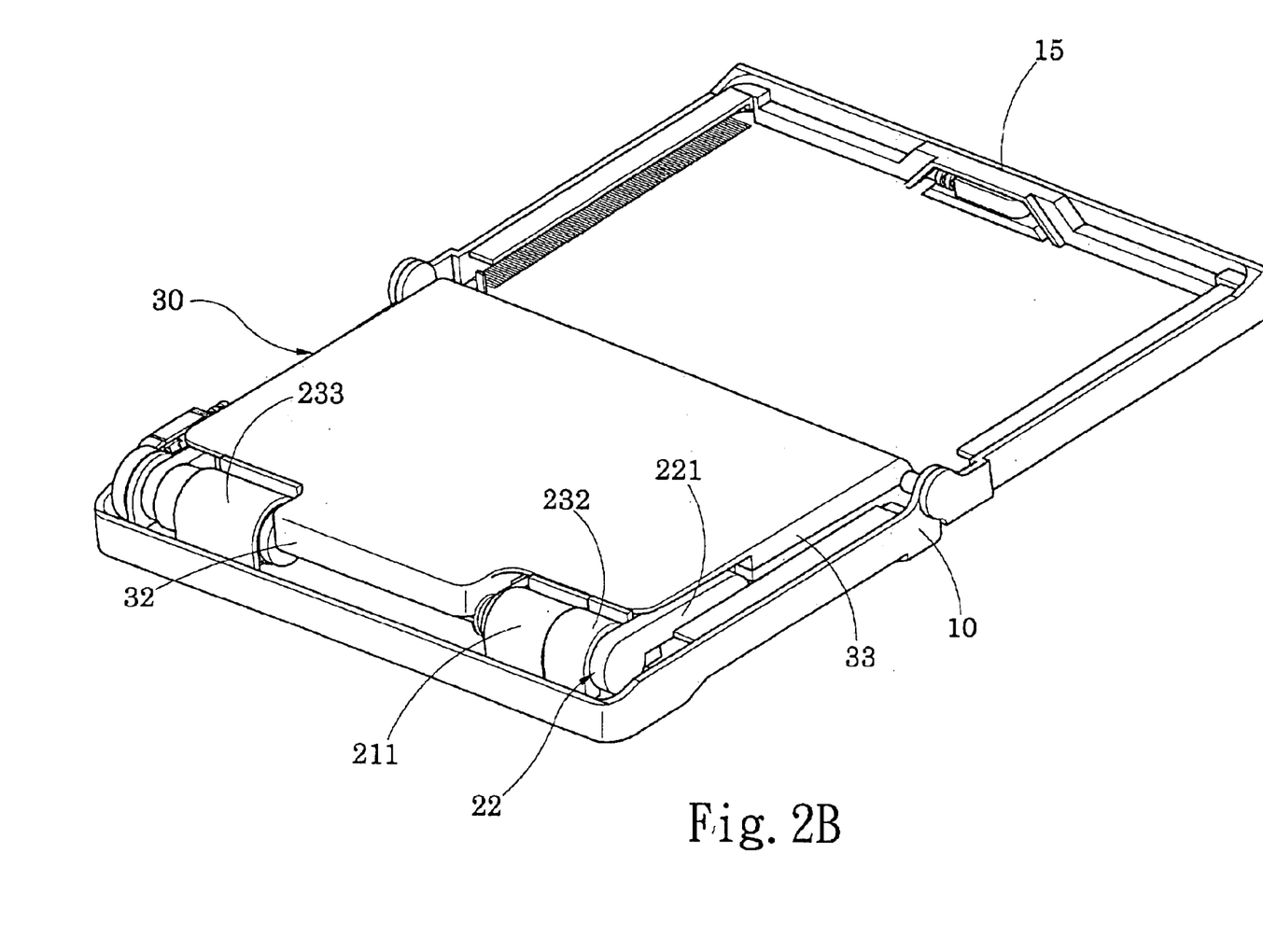
Figure 3A:
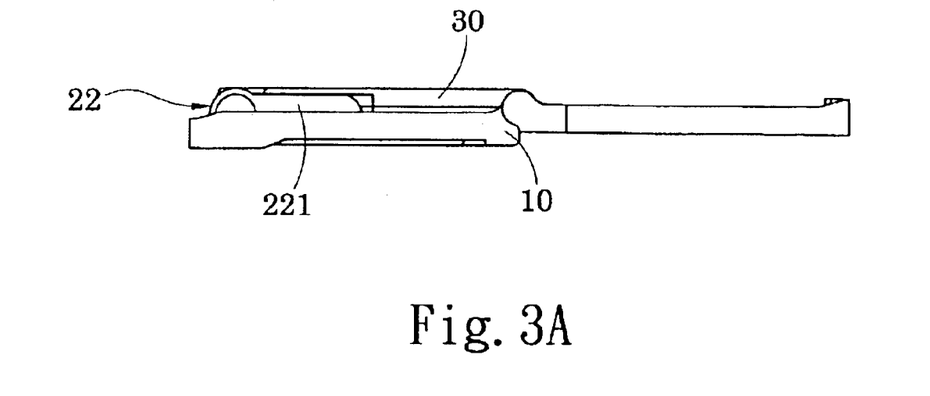
FIGS. 3A, 3B and 3C are illustrative diagrams showing the adjustment and positioning of the keyboard, moving arm, and latch of the present invention.
Figure 3B:
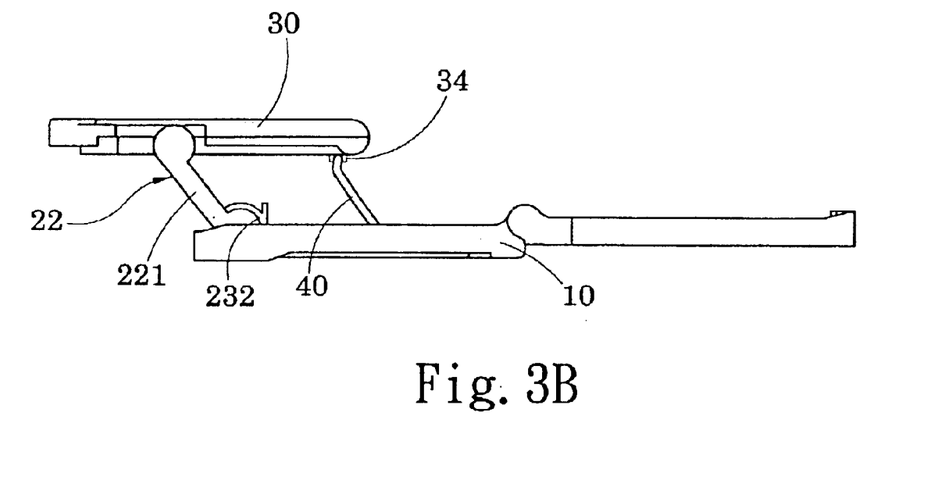
Figure 3C:
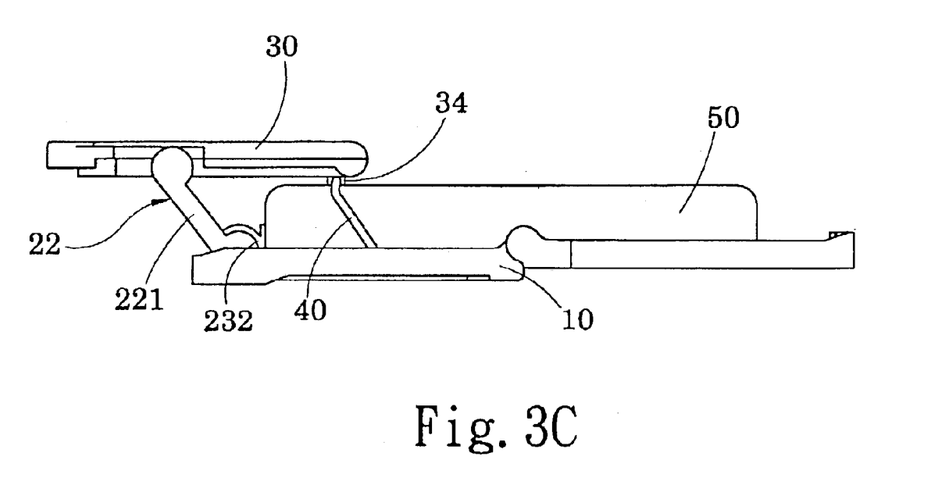
Figure 4A:
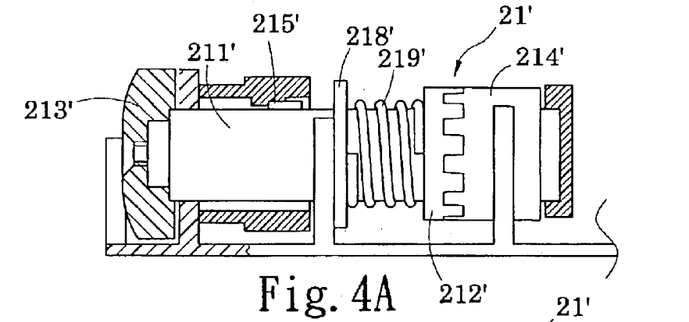
FIGS. 4A, 4B, 4C and 4D are illustrative diagrams showing the adjustment and positioning of the angle-adjusting member of the present invention.
Figure 4B:
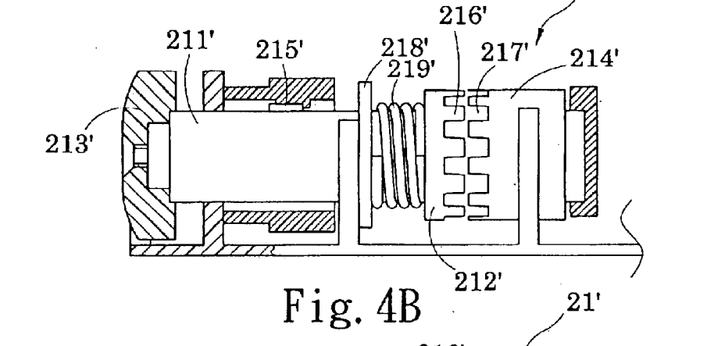
Figure 4C:
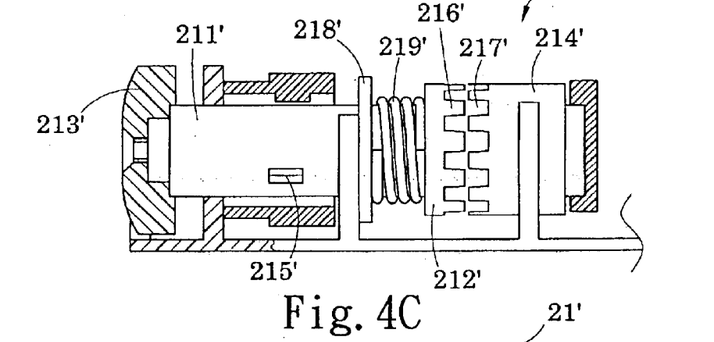
Figure 4D:
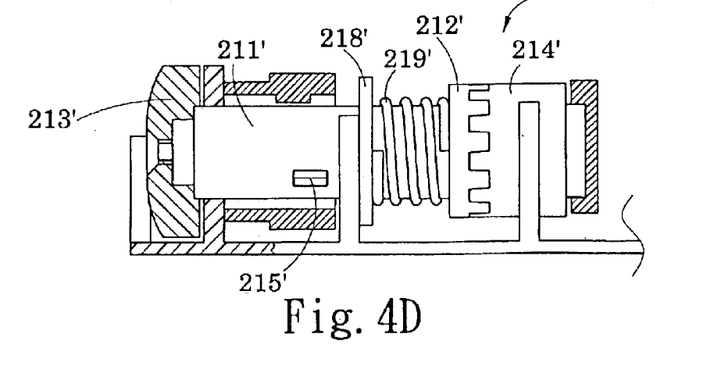
Figure 5:
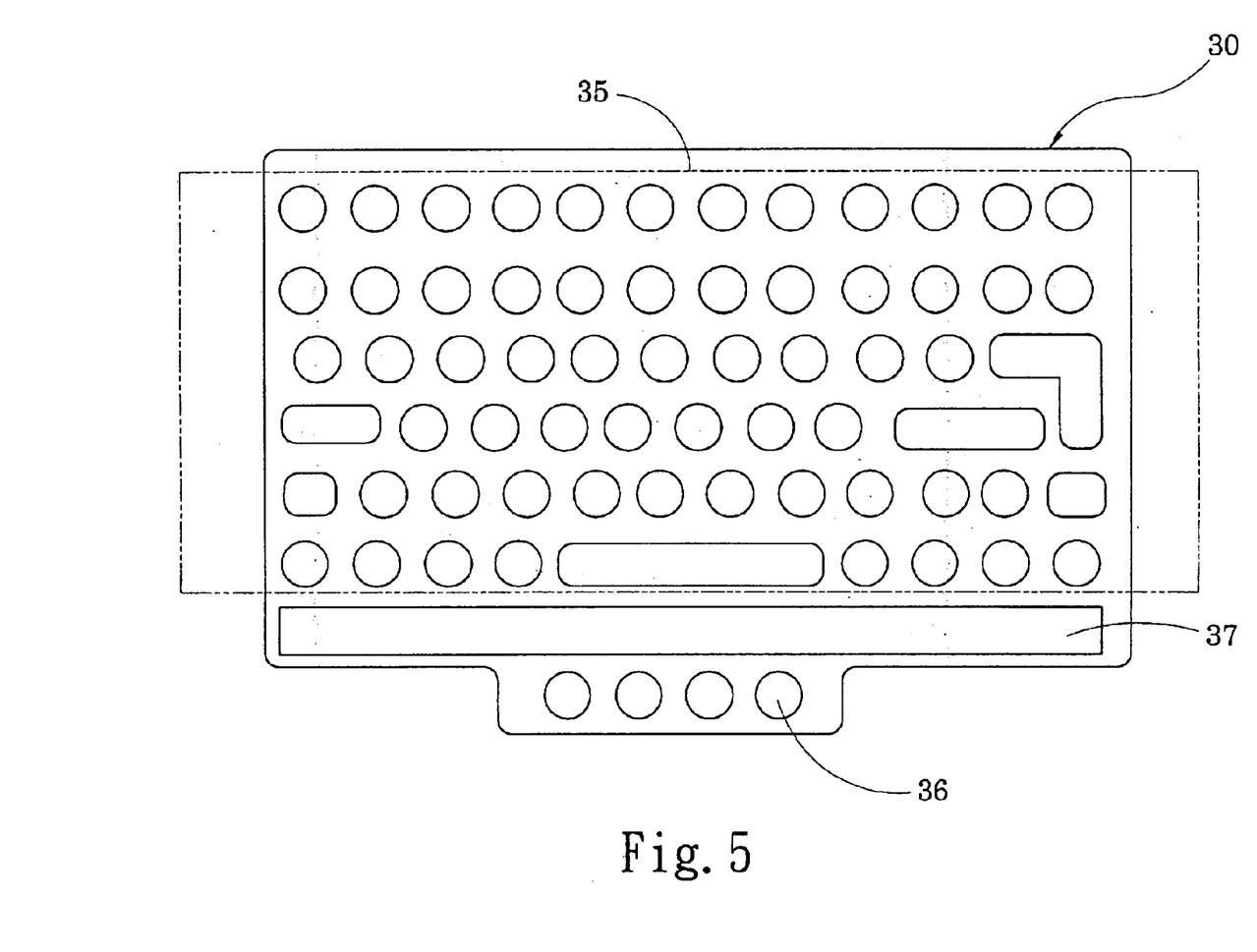
FIG. 5 is an illustrative diagram of the keyboard structure of the present invention.

Please refer to FIGS. 1, 2A and 2B for the illustrative diagrams of the disassembled structure of the present invention and the adjusting movements of the overall assembled structure of the present invention. In the figures, the present invention discloses a keyboard structure using a wireless signal or a connector to connect a keyboard 30 and a personal digital assistant 50, a mobile phone or other handheld devices, and storing the keyboard 30 (as shown in FIGS. 3C and 5); the present invention comprises a folding base 10; an adjusting device 20 disposed on the folding base 10, and a keyboard 30 disposed on the adjusting device 20; wherein:

the folding base 10 forming an accommodating area 11 for putting the personal digital assistant 50, the mobile phone, or other handheld device (as shown in FIG. 3C) disposed between the folding base 10 and the keyboard 30; the assembly of the forging structure enables the keyboard 30 to be adjusted by the adjusting device 20 to displace in parallel on the accommodating area 11 or cover the accommodating area 11 to facilitate users for the application or the storage for carrying;

the adjusting device 20, having a driving member 21 and an angle-adjusting member 21' individually corresponsive to both sides of the folding base 10; a driving arm 22, pivotally coupled between the driving member 21 and the angle-adjusting member 21' and latched to both sides of the keyboard 30; and an accessory base 23 disposed between the driving member 21 and angle-adjusting member 21' and the driving arm 22 and latched upward against the bottom surface of the keyboard 30; the driving member 21 is an oil-pressure cylinder; a first elastic member 211 disposed on the oil-pressure cylinder, and some damper oil (not shown in the figure) coated between the oil-pressure cylinder and the fist elastic member 211, so that when a user presses a switch 15 on the folding base 10 to release the dynamic force of the oil-pressure cylinder, an appropriate elastic buffer of the first elastic member 211 enables the keyboard 30 to be extended stably by the driving of the adjusting device (which is a prior-art and will not be described here), and then drives an axle between the driving arm 22, the driving member 21 and the angle-adjusting member 21' to displace and adjust the overall height of the keyboard to facilitate the personal digital assistant 50 to be placed in the accommodating area 11 (as shown in FIG. 3C);

the driving arm 22 comprises two corresponding latching rods 221, 222 on the outer side of the driving member 21 and the angle-adjusting member 21' and a supporting rod being formed by bending both sides of the latching rods 221, 222 inward and extended correspondingly for accommodating and positioning the driving member 21 and the angle-adjusting member 21'; when the driving arm 22 has to be secured and installed to the driving member 21 and the angle-adjusting member 21', a coupling ring 223 disposed on an end of the latching rod 222 is installed on the outer end of the corresponding angle-adjusting member 21', and then a n-shaped section in the middle of the supporting rod 24 presses against the bottom surface of the driving member 21 and the angle-adjusting member 21' to secure the driving arm 22 in the folding base 10;

after the foregoing assembly is completed, an accessory base 23 composed of a plate 231 and two coupling members 232, 233 individually disposed on the front end of both sides of the plate 231 are coupled to the driving member 21, angle-adjusting member 21', and driving arm 22, and the coupling member 232, 233 of the accessory base 23 is an U-shaped hollow indention to correspond to and cover on the angle-adjusting member 21' and the other side of the driving member 21; further to reinforce the stability of the axle rotation force between the accessory base 23, driving arm 22, driving member 21, and angle-adjusting member 21', the outer side of the coupling member 232, 233 integrally forms a blocking section 234, and a groove 235 of the fixing rod 225 is pivotally coupled to the latching rod 221 on the blocking section 234, and the accessory base 23 is secured onto the slot track 12 in the folding base 10 accordingly, letting both sides of the plate 231 be secured onto a guiding groove 13 of the slot track 12, which constitutes the main displacement axle rotation and supports the structure of the keyboard 30 according to the present invention;

after the main structure of the external keyboard is completed, a protrusion 224, 224' disposed on the inner side of another end of the latching rod 221, 222 is embedded into each of the two corresponding concave holes 31 on the keyboard 30 to facilitate a free adjustment of the overall height of the keyboard 30; in order to reinforce the positioning between the keyboard 30 and adjusting device 20; the foregoing keyboard 30 has a protrusion 32 and a side blocking edge 33 individually disposed between the driving member 21 and the angle-adjusting member 21' corresponsive to the inner edge and both sides of the driving member 21 and angle-adjusting device 21'; by means of the protrusion 32 and the side blocking edge 33 individually restricting the driving member 21, angle-adjusting member 21', and slot track 12, the best engagement effect can be accomplished.

Please refer to FIGS. 3A, 3B, and 3C for the illustrative diagrams of the adjustment and positioning between the keyboard, driving arm, and latch of the present invention. After the personal digital assistant 50, mobile phone, or various handheld device is put into the accommodating area 11 between the keyboard 30 and the folding base 10, and since the keyboard 30 and the driving arm 22 are supported by a single point and unable to provide a stable support effect, therefore the inventor of the present invention installs a latching member 34 on the keyboard 30 to clip and position a hooking section 41, 41' which is separately bent and formed on both sides of a latch 40 to couple an coupling section 14 disposed between the slot track 12 and both sides of the folding base 10, so that the middle rod of the latch 40 is latched and positioned onto the latching member 34; when the folding base 10 is extended or folded, the latching member 34 will integrally move together with the driving arm 22 in a parallelogram form and let the keyboard 30 to displace in parallel within the folding base 10 and accomplish the force for supporting the keyboard 30, which constitutes the preferred embodiment of the present invention.

Please refer to FIGS. 4A, 4B, 4C, and 4D for the illustrative diagrams showing the adjustment and positioning of the angle-adjusting device of the present invention. In the figure, to overcome the shortcoming that the external keyboard structure can only accommodate a single personal digital assistant 50, mobile phone, or one size of various handheld devices, the present invention tries to accommodate the personal digital assistant 50, mobile phone, or different sizes of various handheld devices in the same external keyboard structure (as shown in FIG. 3C) and enable users to fold and extend the keyboard conveniently. Particularly, a meticulously designed structure is set in the angle-adjusting member 21', which comprises an axle rod 211', a first engaging section 211' and an adjusting section 213' individually disposed on both sides of the axle rod 211' and a second engaging section 212' corresponding to the first engaging section 211'. When the personal digital assistant 50 or mobile phone of different size is placed into the folding base 10 (as shown in FIG. 3C), the adjusting section 213' is pulled outward to drive the axle rod 211' so that the first engaging section 212 originally coupled to the second engaging section 214' is compressed by the elasticity of a second elastic member 219' coupled between a positioning section 218' on the axle rod 211' and the first engaging section 212' separated the second engaging section 214' from the first engaging section 212', and then the adjusting section 213' is rotated to drive the axle rod to rotate, so that a first protruded member 215' originally pressing against a second protruded member 226 is separated completely from the second protruded member 226, and then another personal digital assistant 50, mobile phone, or handheld device can be put into the folding base 10. The buffer area with an angle between the second protruded member 226 and the first protruded member 215' can fit different sizes of personal digital assistants 50, mobile phones, or handheld devices (as shown in FIG. 3C). After the adjusting section 213' is released immediately, the originally compressed status of the second elastic member 219' resumes the elasticity to drive the axle rod 211' so that the first engaging section 212' moves toward the second engaging section 214'. By means of the design with a plurality of serrations 216' and serrated grooves 217 on the first and second engaging sections 212', 214', the best engagement and positioning can be accomplished.

Further, please refer to FIG. 5 for an illustrative diagram of the keyboard structure of the present invention. In the figure, to provide a multi-functional keyboard 30 to users, the keyboard 30 has a function key area and an instruction display area 37 in addition to the area of press keys to enhance the utility and economic benefits of the overall keyboard and the external keyboard structure.

Those skilled in the art will readily recognize that these and various other modifications and changes may be made to the present invention without strictly following the exemplary application illustrated and described herein and without departing from the true spirit and scope of the present invention, which is set forth in the following claims.

What is claimed is:

1. An external keyboard structure for connecting a keyboard and various handheld devices by at least one of a wireless signal and a connector, comprising: a folding base;

an adjusting device disposed on the folding base and corresponsive to the keyboard; and an accommodating area disposed between the folding base and the keyboard for receiving one of the handheld devices; wherein said adjusting device comprises a driving member and an angle-adjusting member individually disposed on both inner sides of the folding base; a driving arm pivotally coupled between the driving member and the angle-adjusting member and being pressed against both ends of the keyboard; and an accessory base pressing upward against the bottom surface of the keyboard.

2. The external keyboard structure of claim 1, wherein said driving arm comprises two latching rods corresponding to the outer side of the driving member and the angle-adjusting member and a supporting rod bent and extended correspondingly inward for tightly accommodating and positioning the driving member and the angle-adjusting member, and one of said latching rods at one of its ends comprises a fixing rod and a coupling ring, and a second protruded member is disposed inside the coupling ring, and a protrusion individually disposed on the inner side at the other end of the latching rod, and the protrusion is embedded in two concave holes on the keyboard.

3. The external keyboard structure of claim 1, wherein said accessory base comprises a plate for securing and supporting the keyboard and two coupling members individually disposed on the front end of both sides of the plate and corresponding to the driving member and the angle-adjusting member; and the folding base at both of its sides comprises a slot track for placing the accessory base, and said slot track comprises a guiding groove for securing both sides of the plate.

4. The external keyboard structure of claim 1, wherein said driving member is an oil-pressure cylinder and an elastic member disposed on the oil-pressure cylinder.

5. The external keyboard structure of claim 1, wherein said keyboard corresponding to the driving member and the angle-adjusting member at their inner side and both sides comprise a protrusion and a side blocking edge for latching between the driving member and the angle-adjusting member.

6. The external keyboard structure of claim 1, wherein said keyboard comprises a latching member, such that both sides of a latch are individually bent to form a hook to clip and position a coupling section between the slot track and both sides of the folding base and a rod in the middle of the latch integrally latches and positions on the latching member and enables the keyboard to displace in parallel within the folding base.

7. The external keyboard structure of claim 2, wherein said angle-adjusting member comprises an axle rod, a first engaging section and an adjusting section separately disposed on both sides of the axle rod, and a second engaging section corresponsive to the first engaging section; said axle rod comprises a first protrusion corresponding to the second protrusion, and the first and second engaging sections comprises a plurality of serrations and serrated grooves.

8. The external keyboard structure of claim 7, wherein said axle rod comprises a positioning section, and a second elastic member is disposed between the positioning section and the first engaging section.

9. An external keyboard structure for connecting a keyboard and various handheld devices by at least one of a wireless signal and a connector, comprising: a folding base; an adjusting device disposed on the folding base and corresponsive to the keyboard; and an accommodating area disposed between the folding base and the keyboard; wherein said adjusting device comprises a driving member and an angle-adjusting member individually disposed on both inner sides of the folding base; a driving arm pivotally coupled between the driving member and the angle-adjusting member and being pressed against both ends of the keyboard; and an accessory base pressing upward against the bottom surface of the keyboard, wherein said driving arm comprises two latching rods corresponding to the outer side of the driving member and the angle-adjusting member and a supporting rod bent and extended correspondingly inward for tightly accommodating and positioning the driving member and the angle-adjusting member, and one of said latching rod rods at one of its ends comprises a fixing rod and a coupling ring, and a second protruded member is disposed inside the coupling ring, and a protrusion individually disposed on the inner side at the other end of the latching rod, and the protrusion is embedded in two concave holes on the keyboard.

10. The external keyboard structure of claim 9, wherein said angle-adjusting member comprises an axle rod, a first engaging section and an adjusting section separately disposed on both sides of the axle rod, and a second engaging section corresponsive to the first engaging section; said axle rod comprises a first protrusion corresponding to the second protrusion, and the first and second engaging sections comprises a plurality of serrations and serrated grooves.

11. The external keyboard structure of claim 9, wherein said accessory base comprises a plate for securing and supporting the keyboard and two coupling members individually disposed on the front end of both sides of the plate and corresponding to the driving member and the angle-adjusting member; and the folding base at both of its sides comprises a slot track for placing the accessory base, and said slot track comprises a guiding groove for securing both sides of the plate.

12. The external keyboard structure of claim 9, wherein said driving member is an oil-pressure cylinder and an elastic member disposed on the oil-pressure cylinder.

13. The external keyboard structure of claim 9, wherein said keyboard corresponding to the driving member and the angle-adjusting member at their inner side and both sides comprise a protrusion and a side blocking edge for latching between the driving member and the angle-adjusting member.

14. The external keyboard structure of claim 10, wherein said axle rod comprises a positioning section, and a second elastic member is disposed between the positioning section and the first engaging section.

15. An external keyboard structure for connecting a keyboard and various handheld devices by at least one of a wireless signal and a connector, comprising: a folding base; an adjusting device disposed on the folding base and corresponsive to the keyboard; and an accommodating area disposed between the folding base and the keyboard; wherein said adjusting device comprises a driving member and an angle-adjusting member individually disposed on both inner sides of the folding base; a driving arm pivotally coupled between the driving member and the angle-adjusting member and being pressed against both ends of the keyboard; and an accessory base pressing upward against the bottom surface of the keyboard, wherein said keyboard comprises a latching member, such that both sides of a latch are individually bent to form a hook to clip and position a coupling section between the slot track and both sides of the folding base and a rod in the middle of the latch integrally latches and positions on the latching member and enables the keyboard to displace in parallel within the folding base.

16. The external keyboard structure of claim 15, wherein said accessory base comprises a plate for securing and supporting the keyboard and two coupling members individually disposed on the front end of both sides of the plate and corresponding to the driving member and the angle-adjusting member; and the folding base at both of its sides comprises a slot track for placing the accessory base, and said slot track comprises a guiding groove for securing both sides of the plate.

17. The external keyboard structure of claim 15, wherein said driving member is an oil-pressure cylinder and an elastic member disposed on the oil-pressure cylinder.

18. The external keyboard structure of claim 15, wherein said keyboard corresponding to the driving member and the angle-adjusting member at their inner side and both sides comprise a protrusion and a side blocking edge for latching between the driving member and the angle-adjusting member.

* * * * *